United States Patent [19]
Benesi

[11] Patent Number: 6,159,359
[45] Date of Patent: Dec. 12, 2000

[54] MODULAR FILTER APPARATUS

[76] Inventor: Steve C. Benesi, 611 McClay Rd., Novato, Calif. 94947

[21] Appl. No.: 09/341,001
[22] PCT Filed: Jan. 28, 1998
[86] PCT No.: PCT/US98/01717
§ 371 Date: Jul. 1, 1999
§ 102(e) Date: Jul. 1, 1999
[87] PCT Pub. No.: WO98/33573
PCT Pub. Date: Aug. 6, 1998

Related U.S. Application Data
[60] Provisional application No. 60/034,896, Jan. 31, 1997.

[51] Int. Cl.[7] .................................................. B01D 25/28
[52] U.S. Cl. ............................. 210/87; 100/48; 100/194; 210/106; 210/141; 210/227; 210/387; 210/400; 210/401
[58] Field of Search ............................... 100/45, 48, 193, 100/194, 196, 198, 199, 208; 210/86, 87, 90, 97, 106, 139, 141, 143, 224, 225, 227, 231, 386, 387, 391, 393, 400, 401

[56] References Cited

U.S. PATENT DOCUMENTS

| | | | |
|---|---|---|---|
| 2,418,153 | 4/1947 | Barnett | 210/224 |
| 3,760,945 | 9/1973 | Davis | 210/225 |
| 4,568,460 | 2/1986 | Bratten | 210/387 |
| 4,861,494 | 8/1989 | Bratten | 210/106 |
| 5,059,318 | 10/1991 | Benesi | 210/227 |
| 5,292,434 | 3/1994 | Benesi | 210/227 |
| 5,462,677 | 10/1995 | Benesi | 210/227 |
| 5,573,667 | 11/1996 | Benesi | 210/400 |

Primary Examiner—Joseph W. Drodge
Attorney, Agent, or Firm—Donald C. Feix

[57] ABSTRACT

A modular filter apparatus is formed from stacked filter modules. Slurry to be filtered flows into the apparatus through a flowmeter and check valve into a header. The flow of slurry then branches off through feeders to each of the filter modules. Connected to the header is a slurry supply source, a cakewash supply source and a header drain. The modules are coupled to a hydraulic jack mechanism and an upper strongback.

13 Claims, 9 Drawing Sheets

FIG. 7  PLATES CLOSED

FIG. 8  PLATES OPEN

MODULAR FILTER APPARATUS

This application is a 371 of PCT/US98/01717, filed Jan. 28, 1998 and claims the benefit of Provisional Application No. 60/034,896, filed Jan. 31, 1997.

FIELD OF THE INVENTION

This invention relates to a filter apparatus and a method for operating a filter apparatus and, more particularly, to a filter apparatus for extracting liquids from a wet slurry fluid and for producing a substantially dry filter cake of the solid materials in the slurry. The invention comprises a modular filter formed from individual separable upper and lower plate members combined to form stacked multiple filtration chambers which duplicate the single filter chamber form and include operating mechanisms that open or close each of the filter chambers in programmed order, either simultaneously or sequentially.

BACKGROUND OF THE INVENTION

In many industrial processes and in fluid production systems, a slurry of solids suspended in a liquid is produced and it becomes necessary to separate the solids from the liquids so that each material may be treated in ways that will make disposal or use of the treated materials both economical and environmentally effective. In most such processes or systems, the slurry material is fed to a filter apparatus which may take many forms including a belt press, a vacuum filter or a pressure filter. In one form of pressure filtration apparatus a pair of plate members form an internal space chamber separated by a filter media. The plate members are pressed together at mating surfaces with the filter media positioned between the mating surfaces and spread across the interior space separating one plate from the other plate. Slurry materials are fed into the chamber while filtrate liquids are taken away leaving behind the solids of the slurry accumulated on the filter media. After a sufficient amount of solid materials have been accumulated, the plates are separated and the filter media with the accumulated solids is replaced and the filtration process is then repeated with a clean filter media. The filtrate fluid and solids are then separately used, treated or disposed of in an acceptable manner.

SUMMARY OF THE INVENTION

In accord with the present invention, a filter apparatus is formed with plate members which mate with each other to create a filter chamber between the plate members and a filter medium is positioned between the mating plate members. The filter chamber is adapted to receive the slurry to be filtered and to receive controlled fluids or gasses under pressure to force the liquids from the slurry. The chamber is adapted with suitable means to support a filter medium that will pass the liquids extracted from the slurry while the solids are retained within the chamber. The plates are moved relative to each other to mate the sidewalls and seal the chamber during the filtering process and, after the filtering has been completed, the plates are separated to permit the solids from the slurry to be removed from the filter chamber. In the form of modular units, the upper and lower mating plates are formed as the upper and lower surfaces of a single structure with the upper surface forming a support surface for the filter media and the other surface formed to define a filter chamber when mated to an upper surface of a duplicate structure. Combining modules of these structures in a stack of units produces the stacked modular filter apparatus of the present invention.

When closed against mating structures with a filter medium supported on the support surface, a filter chamber is formed and when slurry fluids are forced into the chamber and treated by wash fluids and/or pressurized gasses a substantially dry filter cake of solids from the slurry is produced on the filter medium. When the mating structures are separated, the dry filter cake remains on the filter medium. The solid filter cake can then be removed from the chamber by movement of the filter medium. The movement of the filter cake is accomplished by moving the filter medium from between the separated plate members both for the purpose of removal and for introducing a clean filter medium between the plates. The plates are then ready to be pressed against each other again for a repeat of the slurry filtering process.

The present invention provides for the use of a continuous filter medium belt that can be placed between the plate members, pressed between the plate member sidewalls and retained within the filter chamber and, when the filtering process has been completed the belt can be advanced to remove the filtered solids and to move a clean filter medium between the plates. The filter apparatus provides a means for advancing the filter medium to a cleaning position outside of the chamber and for sensing the positioning of the filter medium to a proper alignment within the chamber in position for the next filtering operation. This results in more area of filter medium being used, less medium travel, and shorter cycle times. Alternatively, the filter medium may be disposable with the filter cake and a new portion of filter medium is advanced into the apparatus with each batch operation.

It is an object of the present invention to provide modular units of filter apparatus that may be stacked to produce a filter apparatus that has increased capacity for handling slurry fluids with a minimum of floor space.

A further object is the provision of control mechanisms that operate the stacked modular units in an efficient manner.

These and further objects and features of the present invention will be readily apparent to those skilled in the art from the appended drawings and specification illustrating a preferred embodiment wherein:

DESCRIPTION OF THE PREFERRED EMBODIMENT

Figure 1:
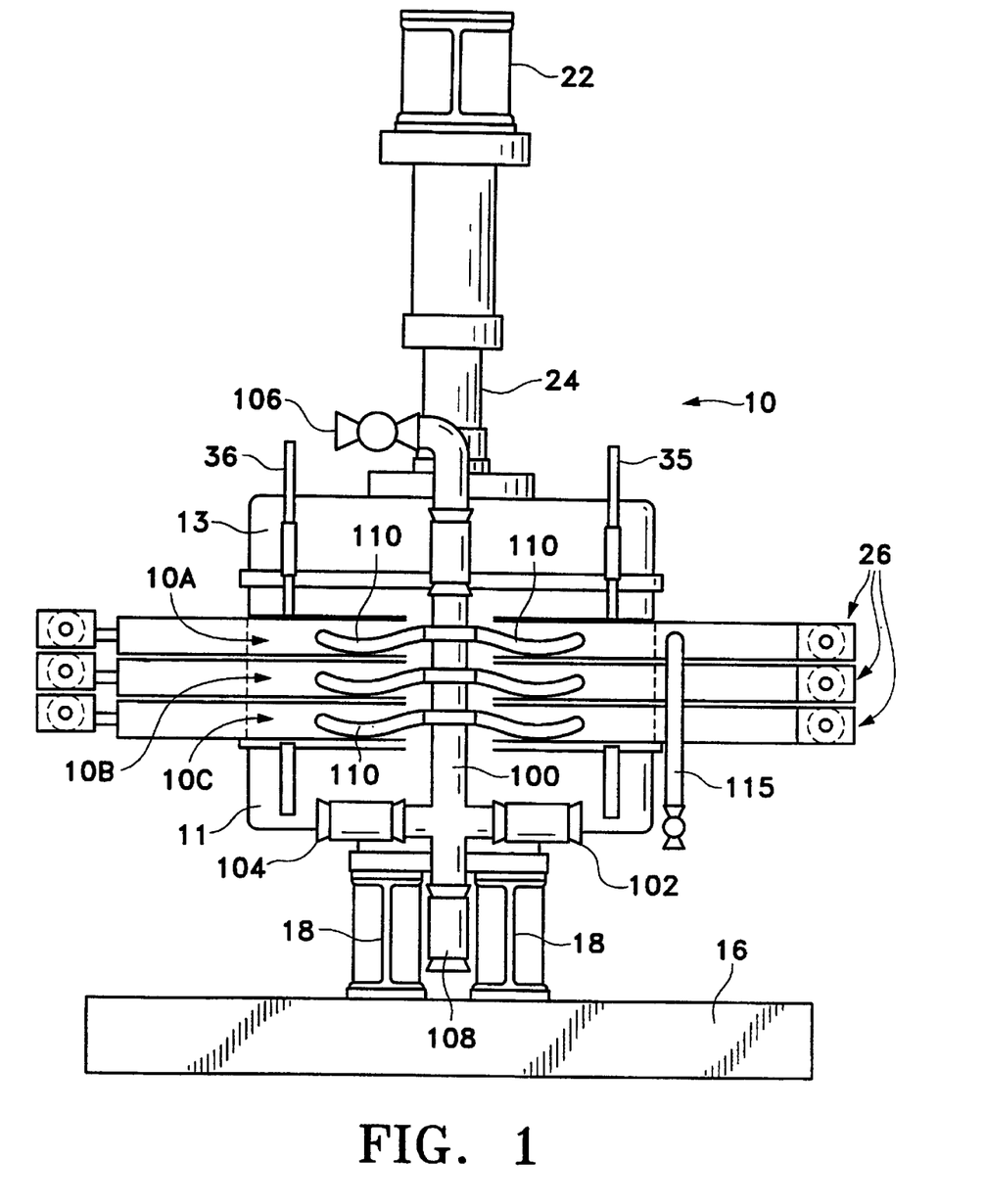
FIG. 1 is a side elevation of a stacked modular filter of the present invention from the inlet side.
Figure 3:
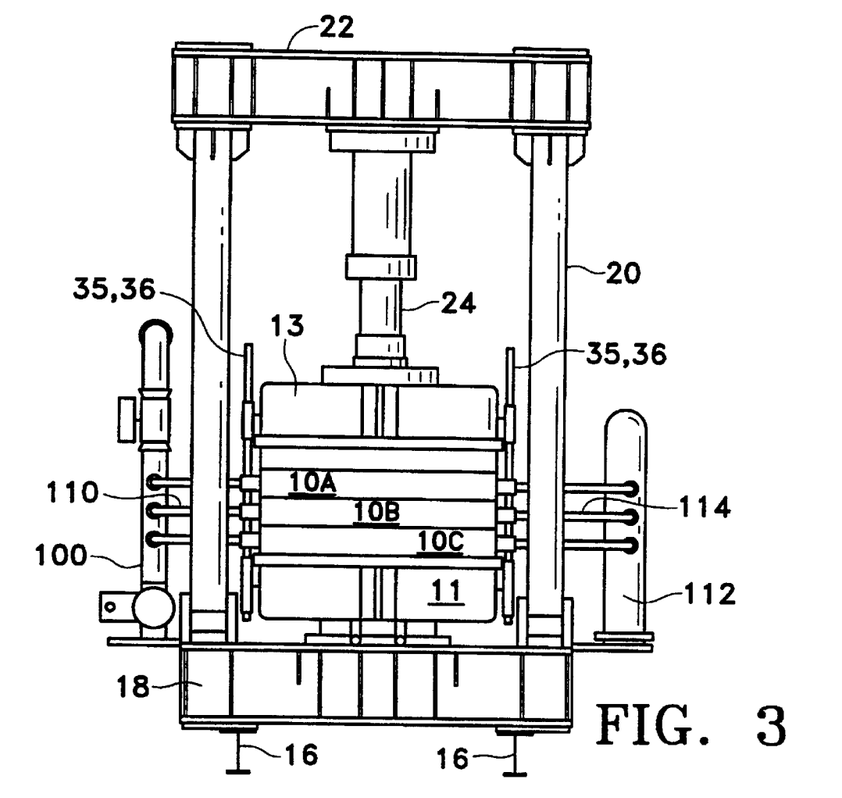
FIG. 3 is an end elevation view of the invention from the discharge end.

As illustrated in the assembly drawing of FIGS. 1 & 3, the filter apparatus 10 of the present invention, shown with the filter modules in their closed position, comprises stacked filter apparatus in modular form with each module including cooperating plates that form a filter chamber and a filter media support with the plates functioning with duplicate plate members to form a plurality of filter modules 10A, 10B and 10C. The modular units are adapted to be supported on and relatively movable within a support frame assembly comprising a pair of base beams 16, a pair of lower strongback members 18, a pair of spaced tension columns 20 (not shown in FIG. 1), and an upper strongback member 22. As shown more clearly in FIG. 3, the support frame assembly is an assembly of the lower strongback members 18 on the base beams 16 with the spaced tension columns 20 mounted on the lower strongback member 18 and the upper strongback member 22 mounted on the tension columns. The frame assembly has an open interior portion for the support of the modular units ont he lower strongback 18, with suitable spacing and bracing. A lower platen element 11 is support on the lower strongback members 18 and an upper platen element 13 is suspended from the upper strongback 22 from an hydraulic jack mechanism 24 between the upper platen and the upper strongback 22. As shown in the assembly drawing FIG. 1, a filter belt drive and guide mechanism 26 is provided at each side of the assembly for each of the filter modules. The belt drive mechanisms include roller means for moving the filter belts, washing means for cleaning the belts, and sensing means for positioning the belts with respect to the filter chambers of the modules. It should also be understood that in the alternative form of the apparatus using a disposable medium, there will be a different feed apparats; however, the medium will be placed in the same location and advanced with each operation of the apparatus.

FIG. 1 illustrates the assembled modular filter apparatus from the inlet side with a header 100 aligned along the side of the assembly. Connected to the header 100 is a slurry supply source 102, a cakewash supply source 104, a compressed air source 106, and a header drain 108. The header 100 is connected to each of the modules by feeders 110 to direct materials from the header separately into each of the modular units. Not shown in the drawing is the control mechanisms that direct the proper fluids or air through the header and drain the header at the appropriate time. Also shown in FIG. 1 at the inlet side of the assembly is the beltwash supply 115 for feeding belt wash fluids to the belt wash area at the appropriate time.

Figure 2:
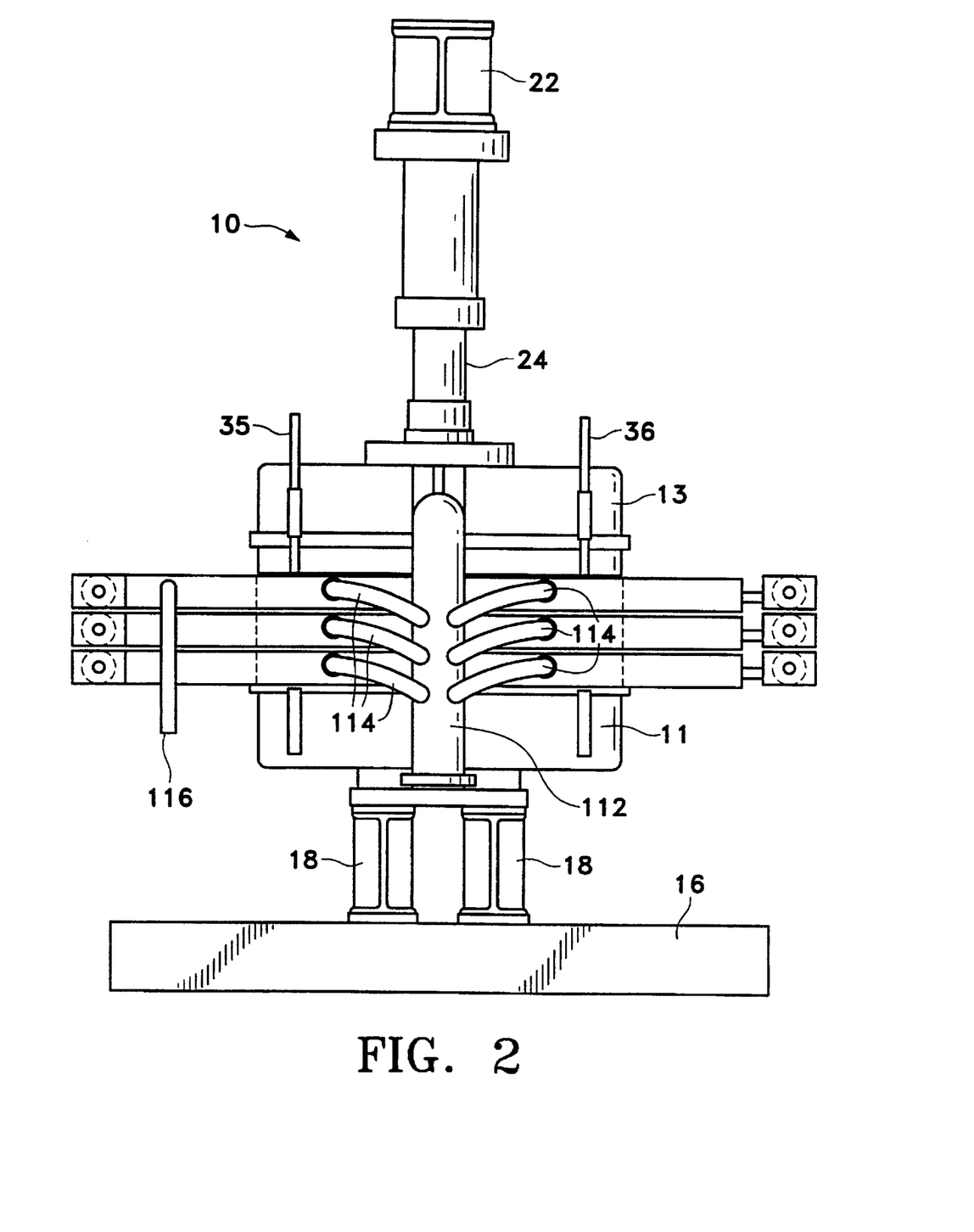
FIG. 2 is an outlet side elevation of the invention.

FIG. 2 illustrates the assembled modular filter apparatus from the outlet side with a header 112 connected by feeders 114 to each of modules to carry filtrates that are extracted during a filtering operation. A beltwash drain 116 is provided to drain fluids from the belt wash area of the apparatus.

FIG. 3 illustrates the assembled modular filter apparatus from the discharge side, the left side as viewed in FIG. 1 or the right side as viewed in FIG. 2, and shows the supply header 100 and the drain header 112, with lines 110 and 114 representing the connections between the headers 100 and 112, respectively, and the modular units of the assembly.

Figure 4:
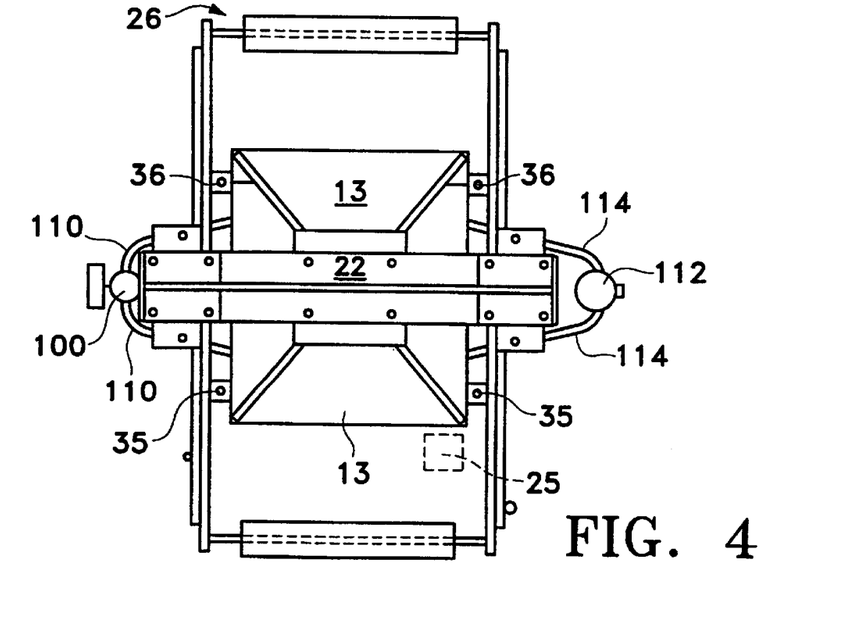
FIG. 4 is a top plan view of the invention.

FIG. 4 illustrates the assembled modular filter apparatus from a top plan view showing the cake discharge end at the bottom and the positions of the headers 100 and 112 with respect to the modular filter units.

Figure 5:
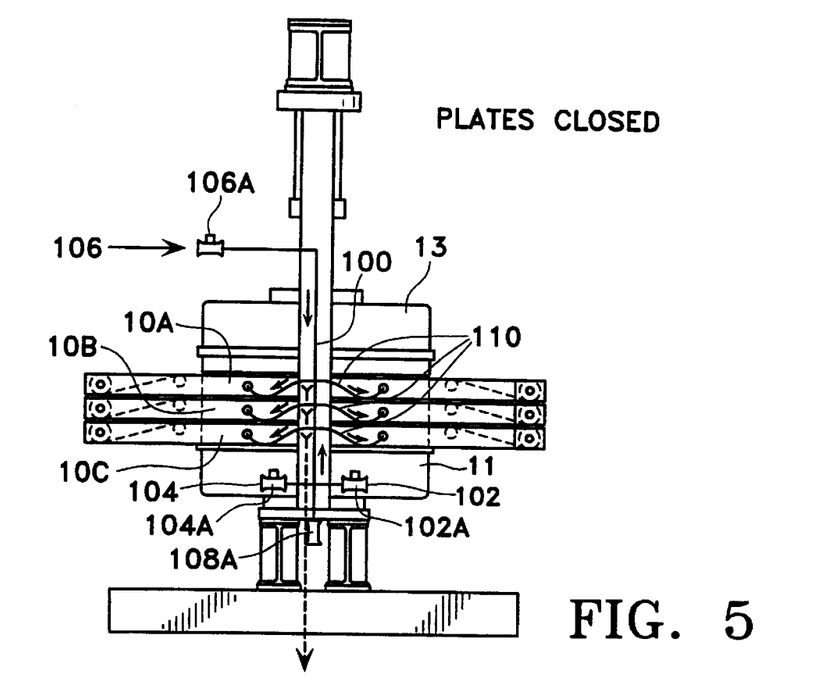
FIG. 5 and 6 are flow diagrams of the invention.
Figure 6:
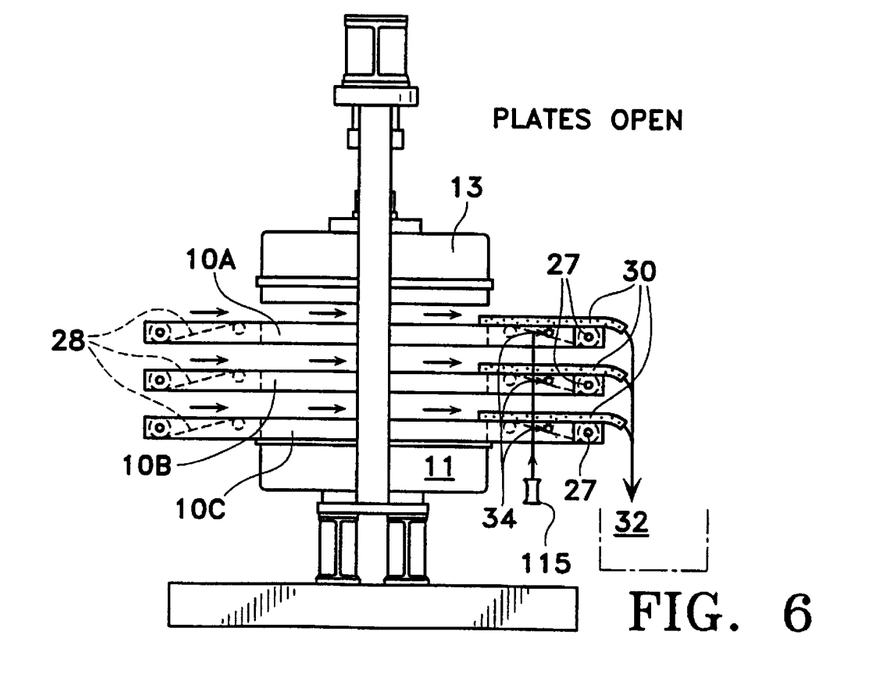

FIGS. 5 and 6 illustrate the modular filter elements in their closed and open positions, respectively. In FIG. 5 the plates of the modular units 10A, 10B and 10C are closed and mating with the opposite faces of a duplicate plate element. When the modules are closed, the slurry supply valve 102A is opened and slurry materials are supplied through the header 100 and feeders 110 to each of the chambers that are formed by the mating elements. When the chambers have been filled, a condition that may be sensed by time, capacity or pressure, the slurry valve 102A is closed and a series of wash or air pressure filtrations are initiated to treat the slurry and to extract filtrate fluids from the slurry. The schedule of slurry treatments is controlled by a suitable control program that may be specific to the filtration of different slurries. In a usual process, a first step is to pass a wash fluid through the slurry to extract selected fluids or chemicals or to pretreat the slurry for further filtration processes. The wash fluids are supplied from wash supply 104 through valve 104A. A second step may be to pass compressed air or gasses through the slurry residue to squeeze fluids from the slurry and to produce a substantially dry filter cake of the remaining solids. The compressed air or gasses are supplied from a source such as plant air 106 through valve 106A. Between slurry filling, slurry washing and air or gas treatment, the valve 108A for the header drain 108 is open to withdraw fluids from the header 100. While slurry filling, slurry washing and gas or air treatments are in progress, the drain header 112 (FIG. 2) is connected by its feeders 114 to the filter modules and filtrate fluids that are extracted from the slurry are drained though that header.

As shown in FIG. 6 with the modules in their open position, the belts 28 may be advanced and the solidified filter cake 30 will fall off of the belt and into a cake discharge bin 32 or the like. After the filter cake has been removed from the belt, the belt passes over the rollers 27 and through a belt wash area 34 where beltwash fluids are forced against the belt to clean it and to remove any remaining solids from the filter process. The belt then travels through the filter modules and remains as a second layer of belt material within the filter chamber as the next filtration process proceeds. Drain fluids from the belt wash area are discharged to a suitable drain (115 FIG. 1) isolated from the discharge bin so as to avoid any wetting of the dry filter cake. It should be understood that further belt treatment may be applied at the entry end of the modules so as to prepare the belt for its function in the separation of liquids from solids in the slurry, such treatment may include chemical washes to make the belt less likely to be contaminated by filtrates or solids in the slurry being filtered.

Figure 7:
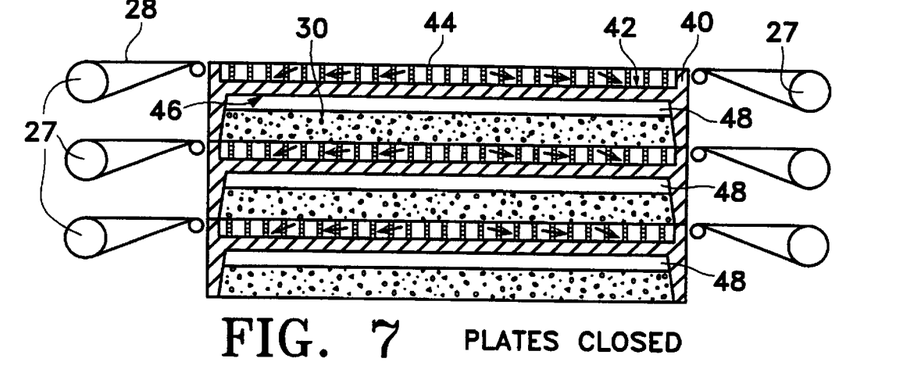
FIG. 7 and 8 are sectional views of the plate elements of the invention.
Figure 8:
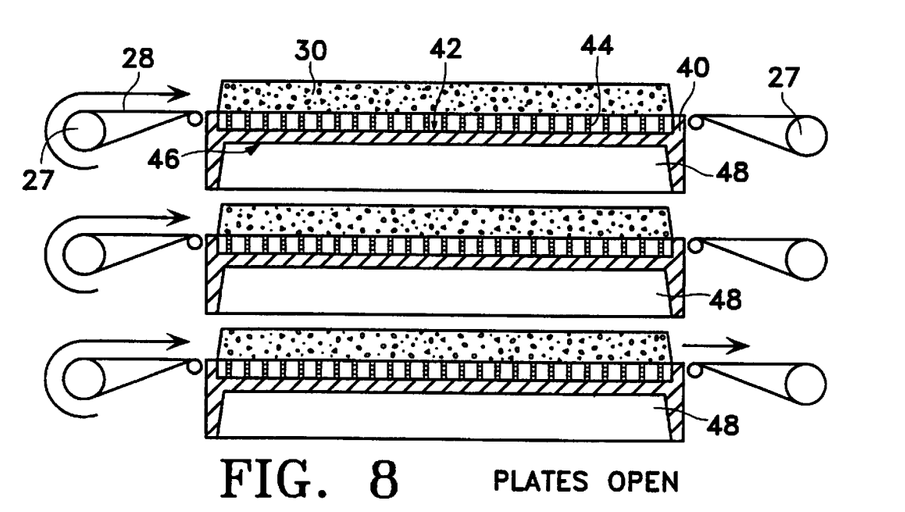

FIGS. 7 and 8 illustrate, in cross-section, the individual plate members that combine with other duplicate members to from the chamber and filter media support surfaces of the modules. FIG. 7 shows the plate members 40 in a closed position with other plates. The structure supporting the chambers and the top platen 13 have not been shown for reasons of clarity. Each plate has one surface 42 defining a support surface for a filter media and adapted to include a media support grid plate 44. The other surface 46 of the plate unit comprises a cavity for defining the filter chamber 48 when mated with the duplicate plate member. FIG. 8 shows the plate members 40 in open position with a representation of a filter cake 30 resting on the filter media 28. The filtered and washed solids of the filter cake 30 are now in position to be transported out of the chamber area in the direction of the arrow at the lower right of FIG. 8 as the filter belt 28 is moved by rollers in the direction of the arrows at the left of FIG. 8.

Figure 9:
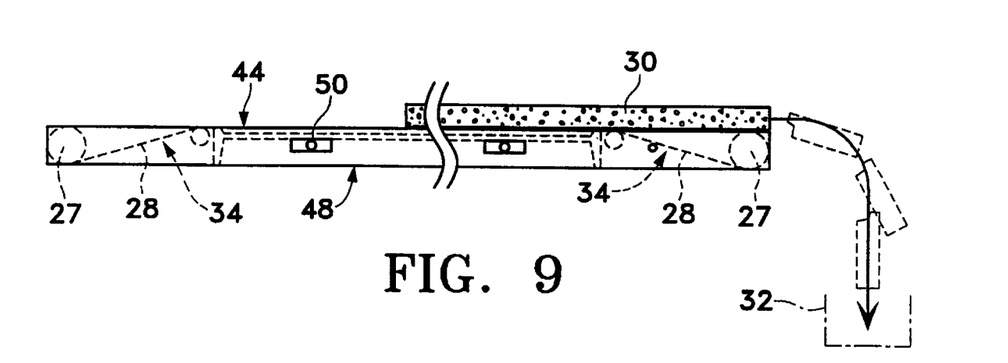
FIG. 9 is a diagrammatic showing of the filter belt and movement of a filter cake.

FIG. 9 illustrates the movement of a filter cake to the cake discharge bin 32 as the filter belt 28 is moved around the rollers 27 from the filter chamber area 48 to the belt wash area 34. Also shown in FIG. 9 is a representation of the filter inlet ports 50 for supplying slurry materials to a filter chamber 48 created when plates are mated.

Figure 10:
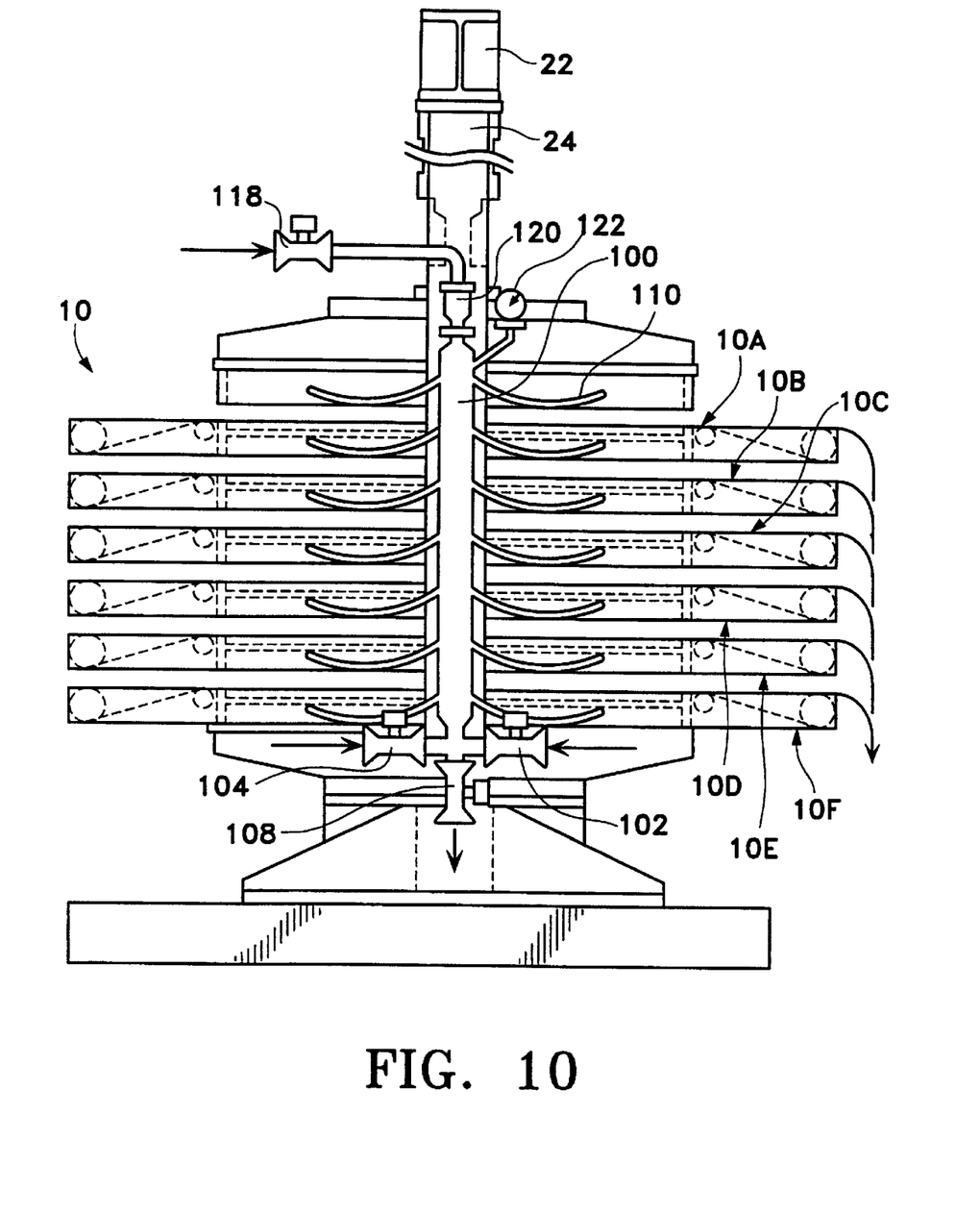
FIG. 10 is a side elevation view of a stacked of six modules in a modular filter apparatus.

FIG. 10 is an illustration of a modular filter apparatus of the present invention having a stack of six filter modules 10A, 10B, 10C, 10D, 10E and 10F. Other than support size and dimensions, the FIG. 10 modular filter apparatus is substantially the same as that shown in FIG. 1. Differences in header sizes and controls will be used to adapt the apparatus to the feed of slurry materials and the discharge of filtrates and filter cake. It should be noted that, other than overhead area, the stack of six modules will take about the same floor space as the stack of three filter modules and, as will be described with respect to FIGS. 15 and 16, the apparatus can be adapted for expansion.

It should be understood that a control panel and control program will be used with the assembled modular filter apparatus to control the introduction of slurry materials, gas dewatering materials, liquid wash materials and other introductions to accomplish the optimized filtration and dryness to a filter cake. The control system is not herein illustrated as it could be specifically designed for many different filtration projects. The control system would control the valves 102, 104 and 108 in the input headers, the positioning of the filter belt 28, the washing of the belt and the cycling of the apparatus.

Figure 11:
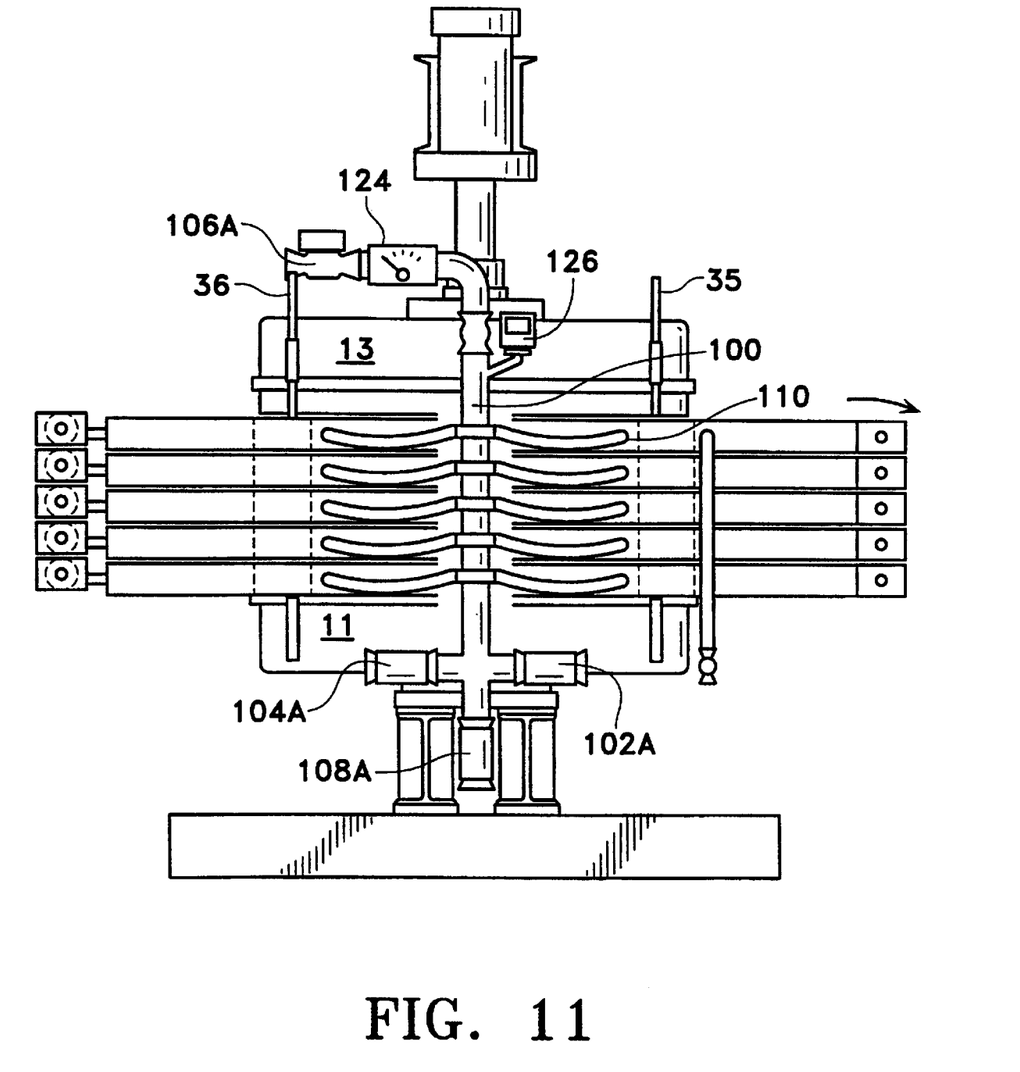
FIG. 11 is a side elevation of a stacked modular filter with flow metered controlled valving for use with a programmable controller.

As shown in FIGS. 10 and 11, the control program may be adapted to control a flowmeter or isolation valve 118 for input slurry fluids. Also a check valve 120 may be installed to isolate wash liquids from the slurry materials. Other combinations of air valves, check valves and isolation valves are possible with the FIG. 10 and 11 apparatus. FIG. 10 also illustrates a pressure gauge for sensing pressure within header 100; that pressure may be used to sense the status of the cake buildup within the chamber modules as well as the pressure of gas or liquid wash feeds. As illustrated in FIG. 11, a flow meter 124 may be used in the blowdown line or slurry input line to sense the rate or quantity of slurry flow to be used by a controller to control input time or quantity. Also shown is a pressure transmitter 126 that may be used to send signals to a main controller for control of valves 102A, 104A, 106A and 108A.

Figures 12, 13, 14:
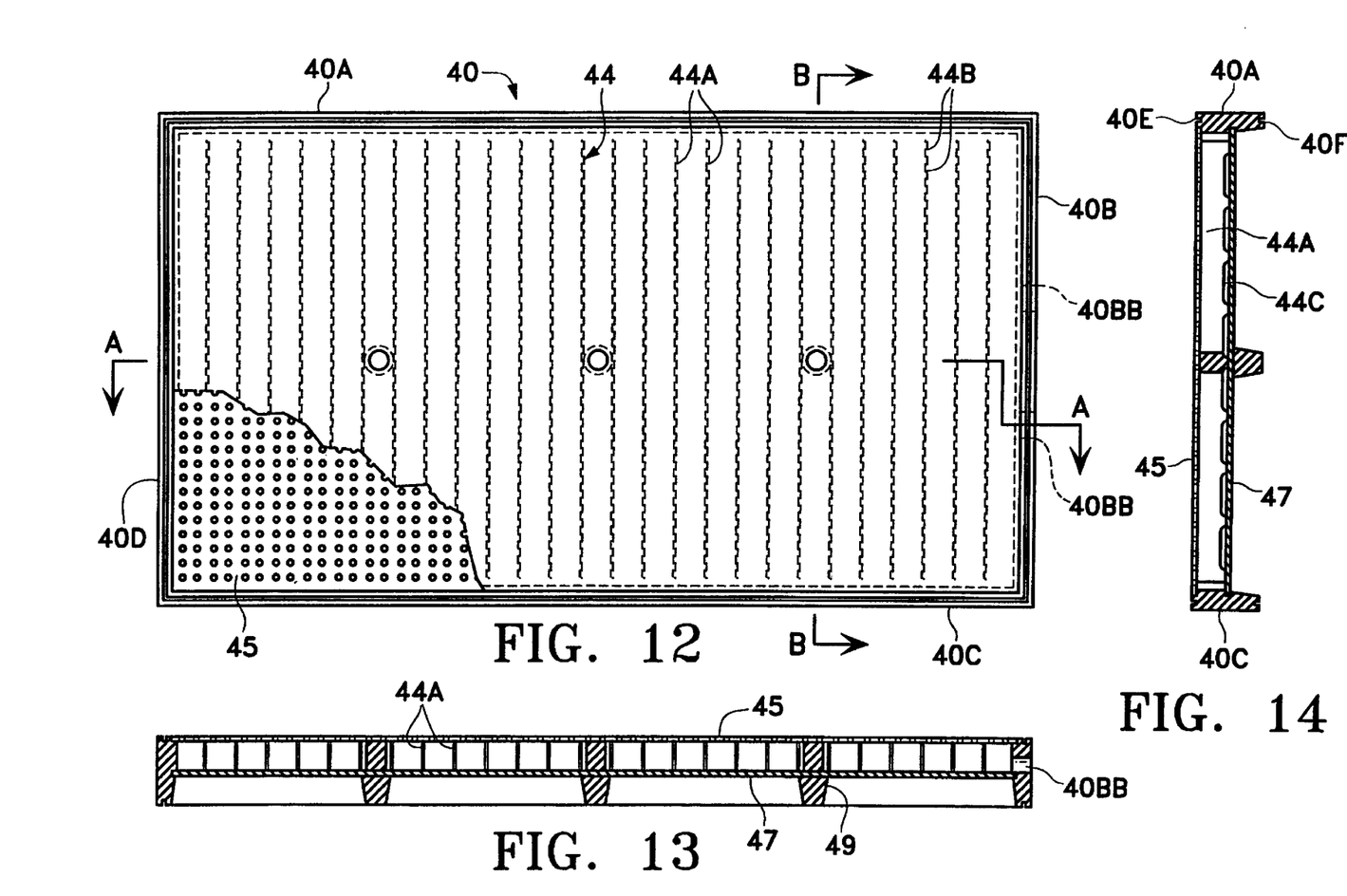
FIG. 12 is a top plan view of the lower chamber of a modular filter illustrating the support structure for the filter medium.
FIG. 13 is a sectional view taken along the lines A—A of FI. 12.
FIG. 14 is a sectional view taken along the lines B—B of FIG. 12.

FIGS. 12, 13 and 14 illustrate an alternative construction of the media support grid apparatus within the chambers. It should be understood that the filter medium 28 is preferably a woven belt that is dimensionally stable and durable. Filter belts are designed for specific filter applications and slurry compositions. The woven belts 28 are supported on a media support grid plate 44 extending across the interior of the chamber formed in the individual plates 40 of the assembly. Each individual plate 40 includes an upper surface 42 for supporting the media support grid plate 44 and another surface 46 that forms a chamber enclosing the milter media 28 on its support grid plate 44 when mated with an upper surface of another individual plate. The closed and open position of the plates are shown in FIGS. 7 and 8. The media support grid plate 44 of FIGS. 12, 13 and 14 differ from the FIG. 7 and 8 form by being constructed of parallel spaced plates 44A extending across the chamber. The plates 44A can be crimped or serpentine formed at 44B along their transverse surface to provide strength and are slotted at their bottom edges 44C. The plurality of plates 44A are joined at the tops to a perforated plate 45 and at their bottom to one side of a solid plate 47. A plurality of horn shaped support members 49 are fixed to the other side of the solid plate 47.

FIGS. 12, 13 and 14 also illustrate an alternative form of a chamber forming individual plate 40. When assembled, the plate includes perimeter walls 40A, 40B, 40C and 40D having upper and lower surfaces with groves 40E and 40F which mate with another assembly to form a chamber. The filter media 28 is supported on the outer surface of the perforated plate 45 (as shown in phantom in FIG. 14) to capture solids from a slurry while fluids and gasses pass through the media, the perforated plate, along the media support grid elements 44A to the solid plate 47 and to a pair of drain 40BB connected to the header drain 108.

With an individual plate 40 formed as shown in FIGS. 12, 13 and 14 large surface area filter chambers (circular or rectangular) in stacked form are structurally possible and functional.

Figure 15:
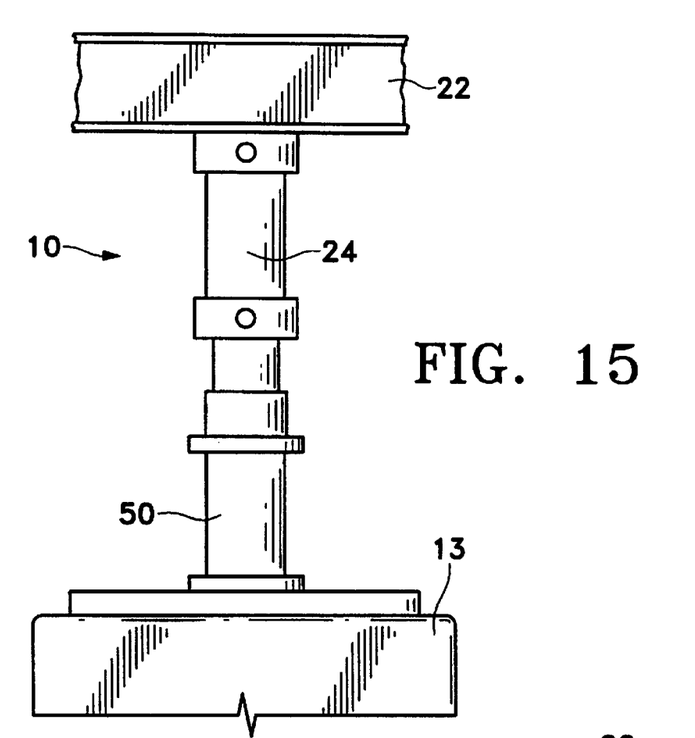
FIG. 15 is a representation of an apparatus for permitting the present invention to be adapted for future expansion.

FIG. 15 illustrates a construction of the stacked filter apparatus of the present invention employing large support base and strongback members adapted for expansion of the apparatus by the addition of filter plate assemblies of the type shown in FIGS. 7 and 8 and FIGS. 12, 13 and 14. With the same framework and hydraulic jack elements and the use of a spool or spacer 50 positioned above the upper platen 13 (or below the lower platen 11) an assembly of a first number of filter chambers can effectively operated. When more capacity is required or desired, the spool or spacer 50 can be removed and additional filter chamber assemblies can be added within the framework of the apparatus.

Figure 16:
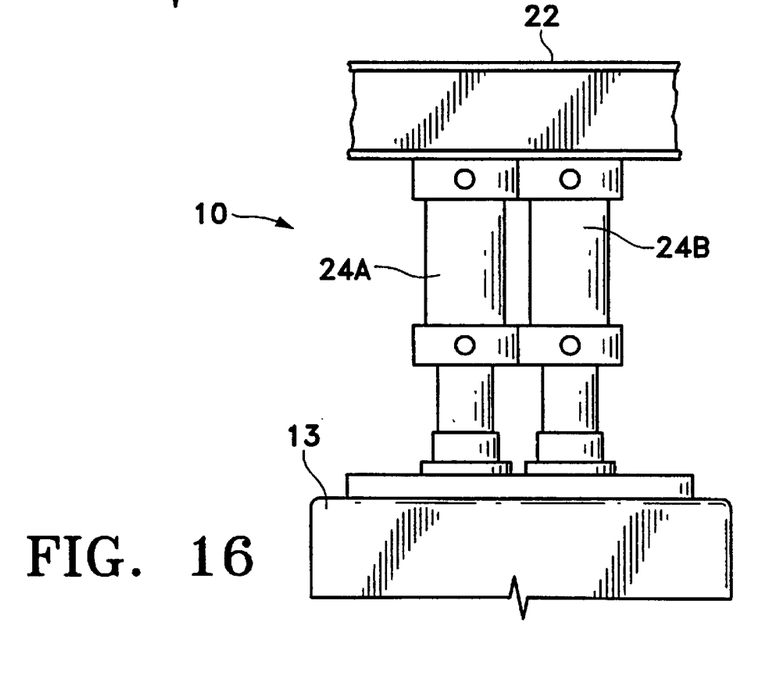
FIG. 16 is a representation of an alternative closing drive for use with higher pressure stacked modular filter.

FIG. 16 illustrates a modification of the assembled apparatus to provide for an increase in the size of the filter area or the pressure applied to the outer surface of the upper platen 13 and through it to the mating surfaces of each of the individual filter chamber assemblies. The FIG. 16 modification includes the use of two (or a plurality) of hydraulic jacks 24A and 24B between the upper strongback member 22 and the upper platen 13. With this modification there is a need to provide additional control of the plurality of jacks to assure that there is uniform pressure applied across the platen. For that purpose, the position of platens 11 and 13 and the individual filter chamber elements are sensed along guide rods 35 and 36 to assure that all mating surfaces are mated properly.

The belt drive mechanism of the present invention includes controls actuated by sensing means in the belt and the filter chambers that assures that the belt is accurately positioned within the chambers. The accurate positioning requires that the belt be positioned transversely (across the filter) and axially (in the path of the belt movement) to maximize the effectiveness of the filter. For that purpose, the belts include means that can be sensed by suitable sensing means and the filter apparatus includes fixed sensors that detect the sensing means in the belts. The sensed belt positions are then supplied to the belt drive mechanism to control the positioning of the belt. FIG. 4 illustrates one possible location for a fixed sensor 25 in the path of the belt filter medium 28. The belt is provided with a sensor means, such as a magnetically, inductively, optically or the like, that can be sensed by the sensor 25.

Some of the additional features of the present invention are:

Its adaptability to the design of filter chambers that will be able to withstand different pressure differentials specific to the slurry materials, cakewash materials and the gas dewatering materials.

The design of modules that will provide for belt tracking and washing.

The filter modules having means for introducing slurry materials, wash materials and gas pressure materials adaptable for increases of pressure and flow to optimize operation as resistance to flow of slurry, cake wash or dewatering increases.

Means for sensing and adjusting optimum operating conditions (flow meters, totalizers, fixed volume tanks, pressure switches, transmitters, variable drive pumps with capabilities of "ramping up" to meet slurry or cakewash requirements).

The modules may be designed to provide optimum chamber depth and configuration and inlet configuration to optimize operation of each slurry.

Means for introducing materials in equal or higher pressure until free liquid has cleared filtered solids, so as not to interrupt flow through solids or to disturb the uniform path of resistance in the cake.

The modules can be designed with input dried compressed air, compressed gas, superheated steam, hot dry air or gas, or a combination of these materials.

The modules and their controls can be designed to provide multiple wash/leach/dewatering operations in one filter cycle.

The control of the units can be set by flow threshold through cake, by pressure of gas flow through the filter cake, by time of gas flow through the filter cake, by volume of gas flow through the cake as means for determining when a optimum dry filter cake has been produced.

The individual filter plate members may be designed to provide the optimum filter chamber depth for different input slurry materials with the objective of producing a desired thickness of filter cake.

The control system can be designed to introduce the slurry materials at a desired pressure and with input stopped when a predetermined pressure has been achieved, the cakewash liquid at a pressure higher than the slurry input pressure and terminated when the back pressure reaches a predetermined pressure, and the blowdown gas at a greater pressure than the cakewash pressure and terminated when blowdown gas has driven the wash liquid out of the cake and a desired dryness has been achieved.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A modular pressure filter apparatus comprising mating modular filter units arranged to be individually openable and closeable elements to establish filter chambers for receiving materials to be filtered and for discharging substantially dry filter cakes on individually movable filter belts within each of said modular filter units comprising:

a) means for opening and closing said elements of each unit and moving said filter belts within each unit whereby when said chambers are formed by said elements being closed with said filter belts between said elements said pressure filter apparatus being formed and sealed by said mating units, b) a manifold means for introducing slurry materials individually to each unit, c) means for introducing pressurized wash materials through said manifold individually to each unit including leaching and multiple wash/leach/dewatering materials, d) means for introducing pressurized gas materials individually to each unit, e) means for sensing filter conditions including pressure, volume and flow of slurry material into and through said units, f) a means for discharging fluids from said filter chamber of each unit, g) means for controlling said means for opening and closing said elements and for moving said filter belts based on said sensed filter conditions, h) means for discharging filter cake solids from said filter units with movement of said belts, i) means for individually washing each of said belts, j) and means for repeatedly actuating the means of parts a) through i) of said filter apparatus and additionally including means for returning and indexing said filter belts between each of said elements when said elements are in open position.

2. A filter module for use with the apparatus of claim 1, each unit comprising mating upper and lower elements with mating perimeter faces, said upper element defining a filter chamber, said lower element defining a support plate with passages for exit of discharged fluids, sealing means formed integrally on said mating perimeter faces, said filter belt being positioned between said upper and lower elements and between said mating perimeter faces, said filter belt being transportable between said elements when said chamber is opened, and further comprising means for stacking filter modules with respect to each other to produce modular filters, an input manifold means connected to each modular filter for introducing slurry, wash fluids and compressed air, an output manifold means connected to each modular filter for liquid and air discharges from each of said modular filters, and belt movement control means for placing said belts between upper and lower elements, for transporting filter solids from said modular filters on said belts, for treating, washing and conditioning said belts, and for positioning said belts for repeat filter operations.

3. An upper filter element for the filter module of claim 1, each unit having internal construction adapted for distribution of input slurry materials substantially uniformily within said respective element when closed as a filter chamber, and means for introducing said fluids and compressed air or gasses uniformly within said chamber at programmable pressures until a desired filter cake is produced.

4. The apparatus of claim 1 with the addition of separate wash means for said filter belts for each unit, said wash means being activated between discharging of filter cake solids position and return of said belt to said filter chamber whereby said means for individually washing each of said belts isolates said discharging filter cake solids.

5. The modular pressure filter unit of claim 1 with the addition of guide rods passing along the exterior of said elements to form said elements into stacked modules, said guide rods guiding the alignment of said stacked modules and said filter belts whereby mating surfaces of said modules and said filter belts are maintained in mating alignment.

6. The modular pressure filter unit of claim 1 wherein said means for opening and closing said elements is a hydraulic jack operating all of said modular units.

7. The apparatus of claim 6 wherein said hydraulic jack comprises a plurality of hydraulic jacks function to open and close said elements and means for maintaining said plurality of jacks in alignment to cause said elements to become aligned.

8. The apparatus of claim 1 wherein said means for controlling includes a flowmeter in said manifold means whereby volume and pressure of said materials flowing through said manifold are monitored for control of said pressure filter operations.

9. The apparatus of claim 1 wherein said means for controlling includes a pressure transmitter in said manifold means for measuring individual flows of slurry, wash fluids and air into said pressure filter apparatus.

10. A modular pressure filter unit comprising an upper and lower element combined with another duplicate unit and defining a filter chamber when combined with and closed under pressure against another unit and an open lateral path when separated from another unit, one surface of each unit comprising a permeable support surface for a filter media, the other surface of each unit comprising a cavity for defining said filter chamber, each said unit being adapted to cooperate with a duplicate unit to form a modular filter structure with mating sealing perimeter surfaces between said one surface of a first unit and said other surface of a second unit with a portion of said filter media between said mating sealing perimeter surfaces and forming a seal for said filter chamber.

11. A pressure filter apparatus comprising a) a frame defined by base members, a lower strongback member, an upper strongback member, and a pair of support members connecting said lower and said upper strongback members and defining an interior area, b) modular filter elements positioned and aligned within said frame at said interior area, c) said modular filter elements including individual elements defining a top filter media support and drain area and a bottom cavity, individual elements of said filter elements mating along perimeter surfaces with duplicate elements to form sealed filter chambers when mated and an open area for movement of a filter media when opened, d) means for moving individual elements with respect to other duplicate elements close said individual elements under pressure with said filter media in sealing position between individual elements and to open said chambers, e) and controller means for actuating said means for moving said elements, for introducing fluids into said chambers when closed, and for moving said filter media when said chambers are open.

12. The apparatus of claim 11 with the addition of a spacer means within said interior area to permit said apparatus to be expanded in capacity by installing additional modular filter elements upon removal of said spacer means.

13. A pressure filter chamber element comprising an upper chamber having a plurality of parallel grid plates with slotted bases supported between a perforated upper plate and a solid lower plate, support members attached to said lower plate and extending within said chamber, said element having a perimeter surface adapted to mate with a perimeter surface of a duplicate element to form and seal said pressure filter chamber element.

\* \* \* \* \*